United States Patent
Pätz et al.

(10) Patent No.: US 6,423,894 B1
(45) Date of Patent: Jul. 23, 2002

(54) MOTOR VEHICLE ROOF WITH OUTSIDE SOLAR GENERATOR

(75) Inventors: Werner Pätz, Hofstetten; Thomas Ganz, Stockdorf; Helmut Teschner, Finning; Reinhard Wecker, Eichenau, all of (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/618,118

(22) Filed: Jul. 17, 2000

(30) Foreign Application Priority Data

Jul. 17, 1999 (DE) .......................... 199 33 651

(51) Int. Cl.[7] ................... H01L 31/042; H01L 31/048; B60R 16/02
(52) U.S. Cl. .................. 136/244; 136/251; 136/291; 180/2.2; 180/65.3; 296/210; 296/211; 296/214; 296/220.01; 296/218
(58) Field of Search ................. 136/244, 251, 136/291; 180/2.2, 65.3; 296/210, 211, 214, 220.01, 218

(56) References Cited

U.S. PATENT DOCUMENTS 4,592,436 A * 6/1986 Tomei ................. 136/245

6,331,031 B1 * 12/2001 Patz et al. .................. 296/211

FOREIGN PATENT DOCUMENTS

| DE | 35 24 026 A1 | 1/1987 |
|---|---|---|
| DE | 88 07 070 U1 | 9/1988 |
| DE | 37 11 180 A1 | 10/1988 |
| DE | 38 30 484 A1 | 3/1989 |
| DE | 3830484 A1 * | 3/1989 |
| DE | 37 33 751 C2 | 7/1989 |
| DE | 40 03 399 A1 | 8/1991 |
| DE | 196 47 730 C1 | 5/1998 |

* cited by examiner

Primary Examiner—Alan Diamond
(74) Attorney, Agent, or Firm—Nixon Peabody LLP; David S. Safran

(57) ABSTRACT

A motor vehicle roof with a solar generator which is securely attached on the outside on the solid roof skin for producing solar current for the vehicle. The solar generator can be adjusted between a first spatially compact configuration and a second, less spatially compact configuration in which its active solar surface projected onto the plane of the roof is larger than in the first configuration. The invention also relates to a motor vehicle roof with an attachment element which runs in the lengthwise direction of the roof and which is mounted externally on the solid roof skin and which is made such that a mobile flat solar generator can be pushed into the attachment element and is held in the working configuration by it to produce solar current.

20 Claims, 2 Drawing Sheets

MOTOR VEHICLE ROOF WITH OUTSIDE SOLAR GENERATOR

BACKGROUND OF THE INVENTION

1. Field of the Invention

This invention according to one aspect relates to a motor vehicle roof with a solar generator which is securely attached on the outside on the solid roof skin for producing solar current for the vehicle. According to another aspect this invention relates to a vehicle roof with an attachment element which runs in the lengthwise direction of the roof and which is mounted externally on the solid roof skin.

2. Description of Related Art

DE 196 47 730 C1 discloses a folding roof for a motor vehicle with a foldable top which is provided with transverse arches which are located at a distance to one another in the lengthwise direction of the motor vehicle and between which there are flat reinforcing elements on the top of the roof which are occupied at least partially with solar cells. The generated solar current is used to operate a fan and/or to charge the battery.

DE 38 30 484 A1 discloses a sliding roof for a motor vehicle in which the sliding cover is provided with solar cells and is supported to be able to move along guide rails which are located on both sides of the roof opening on the solid roof skin. Depending on its position, the cover closes the roof opening or at least partially clears it. The generated solar current is supplied to the motor vehicle by means of a sliding contact via a conductor rail which is provided in one of the guide rails.

DE 37 33 751 C2 discloses a mobile box for setting on the roof of a camping trailer which, in its rest position, surrounds four elongated solar modules which are located as the peripheral sides of a square. The solar modules are folded onto one another in the rest position and are covered from the top by a movable cover. The active side of the solar modules points to the top. The solar modules are made such that they can be folded up from the described rest position after opening the cover of the box perpendicularly to the top, their forming, in turn, the peripheral sides of a square in an overhead view. The active surface of the solar modules in this working position points to the side so that the projection of the active surface onto the roof surface in the working position is much smaller than in the rest position.

Published German Patent Application DE 35 24 026 A1 discloses a motor vehicle with a solar module which is located in the rear window area or side window area and can be stored in a rest position in a folded-together state in a deposition site in the vehicle interior. While it can be unfolded up from this rest position into a working position, its likewise located in a working position in the vehicle interior.

German Patent DE 40 03 399 C2 discloses a solar module which is located in the interior of a motor vehicle and which is integrated into the front visor. The visor is made to be unfoldable in two parts so that, in the unfolded position of the sunshade, the active surface of the solar module is enlarged. The solar module is located in the vehicle interior.

SUMMARY OF THE INVENTION

An object of this invention is to devise a motor vehicle roof which offers as much solar generated power as possible at under proportionally increased preparation prices, there being no solar generator in the vehicle interior.

This object is achieved by a solar generator for a motor vehicle roof, wherein the solar generator is adapted to be securely attached to the outside of the roof, and is adapted to be adjusted between a first spatially compact configuration and a second, less spatially compact configuration in which a projection of the active solar surface of the generator onto the roof in the second configuration is larger than in the first configuration.

This object is further achieved by a solar generator attachment element for a vehicle roof, in which the attachment element is mounted to the roof extending in a lengthwise direction of the roof, and wherein the attachment element is adapted to receive a mobile flat solar generator pushed into it which is adapted to hold the solar generator in a working configuration.

In the invention it is advantageous that the solar generator is flexible to the extent that, between a spatially compact configuration in which the generated solar power is low and a less compact configuration, it can be chosen in which the generated solar power is larger.

Preferably, the solar generator is made such that the first configuration is suitable for driving, while the second configuration is suited for stationary operation. Since the solar generator surface which is formed in the second configuration, in addition to the first configuration, need not meet the requirements for high speed driving, this generator part relative to the generated power can be made much more simple and, thus, economical than the solar generator surface which is active in the first position.

Preferably, on the outside on the solid roof skin an attachment element which extends in the lengthwise direction of the roof is attached and acts as an attachment for the solar generator at least in the second configuration. Here it is preferably a correspondingly modified roof railing. This has the advantage that there need be no additional attachment elements which are not already present.

Preferably, the solar generator includes several flat solar elements, and at least one of the solar elements can be adjusted and the solar elements in the first configuration lie essentially over one another and in the second configuration lie essentially flat next to one another. Here the solar generator preferably includes a housing which is a flat box and which holds all the solar elements in the first configuration of the solar generator.

The attachment element essentially includes two parallel guide rails which run in the lengthwise direction of the roof and between which the adjustable solar elements are guided outside the first configuration. The guide rails being contact rails for electrical contact of the adjustable solar elements in the second configuration.

Preferably, the solar elements in the second configuration are so far over the solid roof skin that the solar elements are ventilated from the rear.

It is advantageous that the solar generator can be made especially simple since it need not be permanently mounted on the solid roof skin.

Preferably, the solar generator includes several flat solar elements which lie flat next to one another in the working configuration, the attachment element being made preferably as a modified roof railing along which the solar elements are guided.

These and further objects, features and advantages of the present invention will become apparent from the following description when taken in connection with the accompanying drawings which, for purposes of illustration only, show several embodiments in accordance with the present invention.

DETAILED DESCRIPTION OF THE INVENTION

Figure 1:
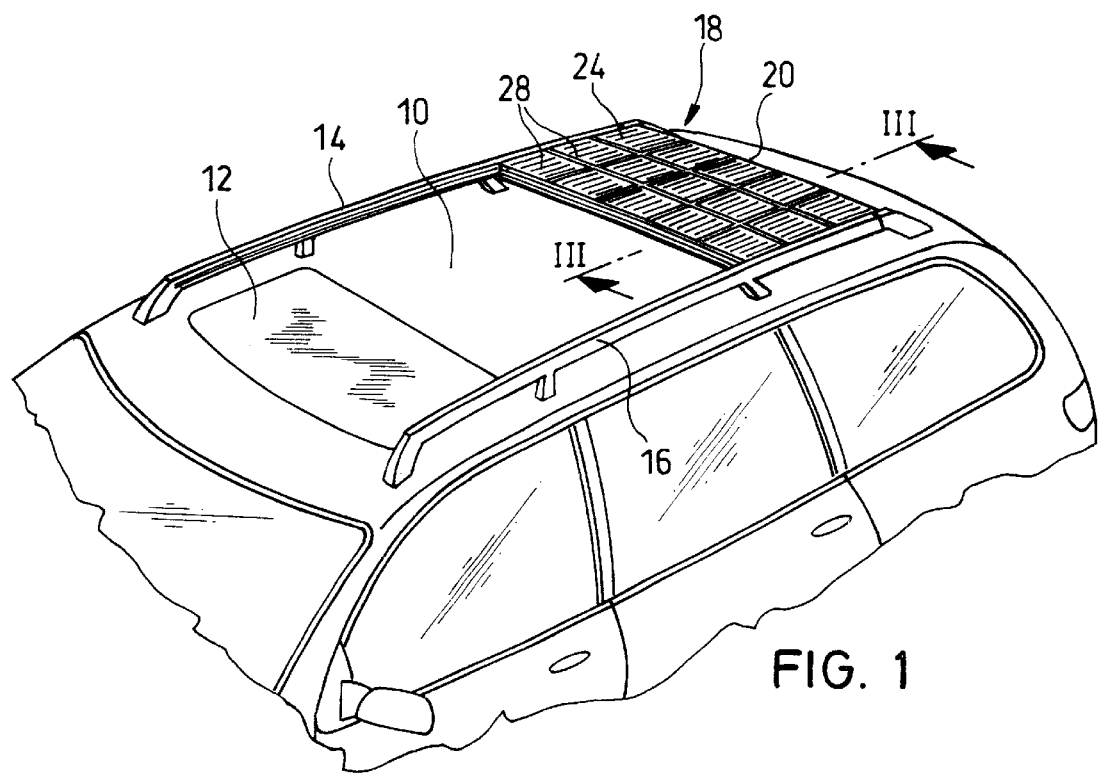
FIG. 1 is a perspective view of a motor vehicle roof of the invention with a solar generator which is in the rest configuration.

As shown in FIG. 1, the solid skin of a motor vehicle roof 10 is provided with a roof opening which is closed by a cover 12. On each side of the vehicle roof, a rail 14 and 16, of a modified roof railing, is securely attached externally on the solid roof skin. Near the back end of the rails 14 and 16 a solar generator 18 is securely mounted between the two rails 14 and 16. The solar generator 18 includes a housing 20 which is a flat box. In the rest configuration of the solar generator shown in FIGS. 1 and 3, three adjustable flat solar elements 22 are lying on top of one another in the housing 20. Furthermore, in the housing 20 there is a stationary solar element 24 which is located underneath a transparent cover 26 of the housing 20 above the adjustable solar elements 22 which are lying on top of one another.

Figure 2:
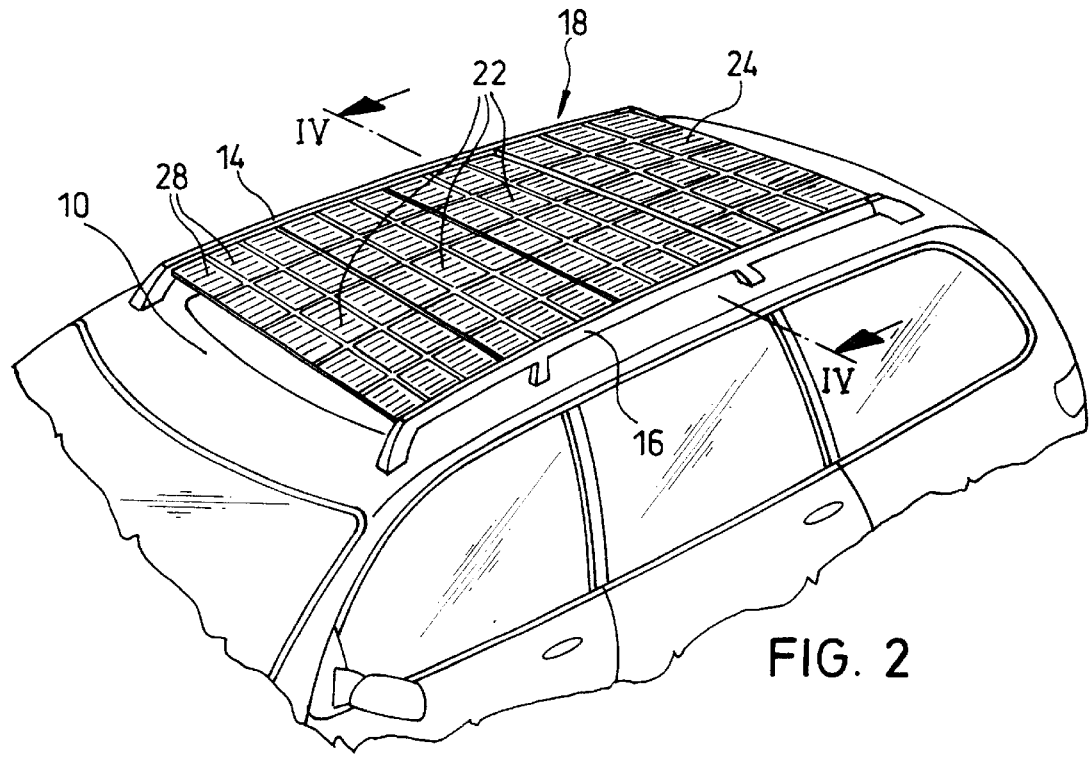
FIG. 2 is a perspective view like FIG. 1, but the solar generator is shown in the working configuration.
Figure 3:
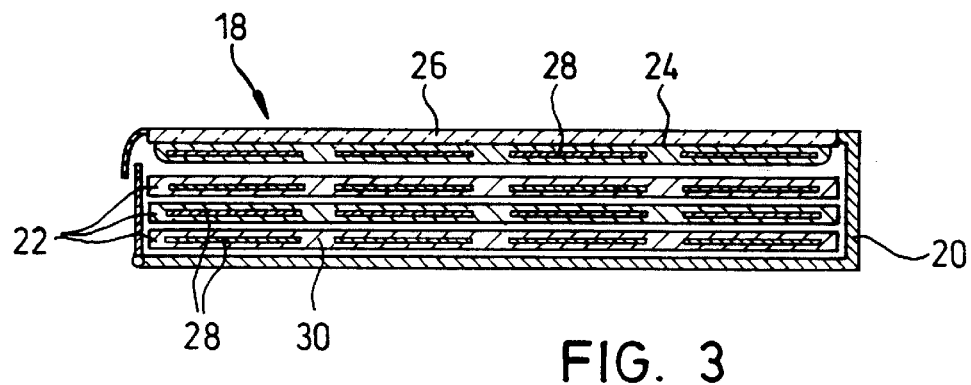
FIG. 3 is a cross-sectional view taken along line III—III in FIG. 1.
Figure 4:
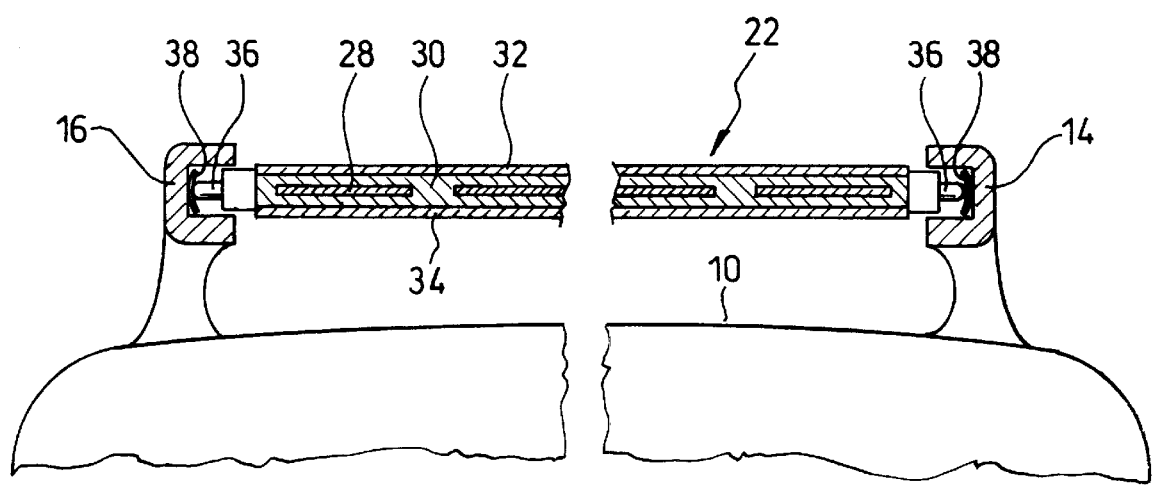
FIG. 4 is a cross-sectional view along line IV—IV in FIG. 2.

The rails 14 and 16 are guide rails for the adjustable solar elements 22 so that the adjustable solar elements 22 can be moved from the compact configuration which is shown in FIGS. 1 and 3 into a working configuration as shown in FIGS. 2 and 4 in which they lie essentially flat next to one another and essentially cover the entire roof surface. In this working configuration, in which the solar generator is overall spatially less compact, the active solar surface of the solar generator 18 projected onto the plane of the roof is much larger than in the rest configuration as shown in FIGS. 1 and 3 in which only the stationary solar element 24 is active. In the working configuration on the other hand all solar elements 22 and 24 are active. The guide rails 14 and 16 are also contact rails for the adjustable solar elements 22 so that in the working configuration they form a corresponding electrical contact with the corresponding outgoing electrical cables so that the solar current generated by the adjustable solar elements 22 can be used in addition to the solar current generated by the stationary solar element 24. The generated solar current can, for example, be used to operate a fan in the vehicle interior and/or to charge the vehicle battery.

As shown in FIG. 4, the guide rails 14 and 16 are such that the adjustable solar elements 22, in the working configuration, each lie a few centimeters above the solid roof skin 10 so that the solar elements 22 are rear ventilated so that, on the one hand, the solar elements 22 and 24 are less strongly heated than if they were installed in a closed roof surface and, on the other hand, the solar elements 22 and 24 hinder direct incident solar radiation onto the solid roof skin 10 or the cover 12. This reduces the heating of the vehicle interior.

The housing 20 of the solar generator 18 is made such that in the rest configuration as shown in FIGS. 1 and 3 it meets the requirements for high speed driving. On the other hand, the solar generator 18 is made such that in the working configuration shown in FIGS. 2 and 4 it can only be used for an essentially stationary vehicle. In this way, the adjustable solar elements 22 can be made simpler and more economical than if they were mounted stationary and, thus, would have to meet the conditions for high speed driving.

Movement of the solar generator 18 between the working configuration and the rest configuration or vice versa can take place manually or by means of an electric drive. In the case of electrical movement, there can be a linkage to the climate control components of the motor vehicle for control purposes.

One alternative embodiment of the invention includes no stationary solar elements for driving so that the solar generator in the rest configuration need not be mounted stationary on the vehicle roof. Here the solar generator is made such that, in the rest configuration, it is stored, for example, in the trunk or in the vehicle interior in the folded-together or pushed-together state, while, if necessary, it is pushed manually into an attachment element which runs in the lengthwise direction of the roof and which is attached on the solid roof skin in order to generate solar current in the resulting working configuration.

According to one preferred embodiment, the solar generator and the attachment element are made similarly to the embodiment described in FIGS. 1 to 4, i.e. several adjustable solar elements 22 which lie flat next to one another in the working configuration can be pushed into the rails 14 and 16 of a modified roof railing. Here the rails 14 and 16 are guide rails which are and also contact rails for producing electrical contact in the working configuration for tapping of the generated solar current. In contrast to the embodiment which is described in FIGS. 1 to 4, the stationary solar element 24 is replaced by a fourth adjustable solar element 22, no housing 20 attached to the rails 14 and 16 being necessary.

The solar elements 22 are preferably made essentially identically as separate elements which if necessary are pushed individually in succession into the rails 14 and 16 and, in doing so, are accordingly electrically contacted individually via the rails 14 and 16. Here it is conceivable that, depending on the requirement, not all four solar elements 22, but only one or two or three of the solar elements 22 are pushed into the rails 14 and 16 to form the working configuration. The individual solar elements 22, if they are not needed for the working configuration, can be stored for example in the trunk of the motor vehicle or even outside the vehicle, for example in a garage. Preferably, the solar elements 22 are made such that in the working configuration they are suited only for stationary operation of the vehicle so that they can be made accordingly simply and economically.

The solar elements 22 and 24 are preferably film modules, which include a plurality of solar cells 28 which are electrically connected via the corresponding connectors being embedded in an adhesive film layer 30 which in turn is protected to the top and bottom by a protective layer 32 and 34. The upper protective layer which can be glass or plastic is transparent. FIG. 4 shows, laterally on the solar element 22, the electrical contacts 36 which each produce electrical contact with a conductor rail 38 which is in the guide rails 14 and 16. The contacts 36 are preferably elastic spring contacts.

Although, in the two embodiments, the solar elements 22 are preferably made such that they are suited only for operation with the vehicle stationary, it is, however, fundamentally possible to make the solar elements of the solar generator such that they are also suitable for operation with the vehicle moving.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications.

What is claimed is:

1. A solar generator for a motor vehicle roof, wherein said solar generator is adapted to be securely attached to the outside of said roof and wherein said generator is adapted to be adjusted between a first spatially compact configuration and a second, less spatially compact configuration in which a projection of the active solar surface of said generator onto said roof in said second configuration is larger than in said first configuration, said generator including an attachment element that extends in a lengthwise direction of said roof and wherein said attachment element attaches said generator to said roof in said second configuration, said attachment element supporting said solar generator for adjusted movement lengthwise of the roof between said first spatially compact configuration and said second, less spatially compact configuration.

2. The generator of claim 1, wherein said attachment element is a modified vehicle roof railing.

3. The generator of claim 1, said generator comprising a plurality of solar elements, wherein at least one of said plurality of solar elements is adjustable and wherein said solar elements lie over one another in said first configuration and lie essentially flat next to one another in said second configuration.

4. The generator of claim 3, wherein said plurality of solar elements are spaced a distance from said vehicle roof to define a ventilation space.

5. The generator of claim 3, wherein at least one of said plurality of solar elements is a stationary solar element having a position that is independent of the configuration of said solar generator.

6. The generator of claim 3, further comprising a housing which holds said plurality of solar elements in said first configuration.

7. The generator of claim 6, wherein said housing is a flat box.

8. The generator of claim 6, wherein at least one of said plurality of solar elements is a stationary solar element having a position that is independent of the configuration of said solar generator and wherein said housing includes a transparent cover under which said stationary solar element is located.

9. The generator of claim 1, said generator comprising:
a plurality of solar elements, wherein at least one of said plurality of solar elements is adjustable and wherein said solar elements lie over one another in said first configuration and lie essentially flat next to one another in said second configuration; and
a housing attached to said attachment element, wherein said housing holds said plurality of solar elements in said first configuration.

10. The generator of claim 1, said generator comprising:
a plurality of solar elements, wherein at least one of said plurality of solar elements is adjustable and wherein said solar elements lie over one another in said first configuration and lie essentially flat next to one another in said second configuration;
wherein said attachment element also acts as a guide for said solar elements when transitioning between said first and second configurations.

11. The generator of claim 10, wherein said attachment element comprises two parallel guide rails that run in a lengthwise direction of said vehicle roof and which guide said plurality of solar elements when not in said first configuration.

12. The generator of claim 11, wherein said guide rails provide electrical contact for the plurality of solar elements in said second configuration.

13. The generator of claim 1, wherein said first configuration is adapted for driving and said second configuration is adapted for stationary operation.

14. A solar generator attachment element for a vehicle roof, wherein said attachment element extends in a lengthwise direction of said roof, wherein said attachment element is mounted on said roof and wherein said attachment element is adapted to receive a mobile flat solar generator including a plurality of flat solar elements being pushed into said attachment element and which is adapted to hold said solar generator in a working configuration, each of said plurality of flat solar elements including a plurality of solar cells.

15. The attachment element of claim 14, wherein said plurality of flat solar elements lie next to each other in said working configuration.

16. The attachment element of claim 15, said element comprising two parallel guide rails extending in said lengthwise direction and wherein said guide rails are adapted to guide said flat solar elements.

17. The attachment element of claim 15, wherein said guide rails are adapted to provide electrical contact for each of said flat solar elements in said working configuration.

18. The attachment element of claim 15, wherein said plurality of flat solar elements define a ventilation area between said vehicle roof and said flat solar elements when said flat solar elements are positioned in said working configuration.

19. The attachment element of claim 15, wherein said plurality of flat solar elements are adapted only for stationary operation of said motor vehicle in said working configuration.

20. The attachment element of claim 14, said element comprising a modified vehicle roof railing.

* * * * *